United States Patent
Jones et al.

(10) Patent No.: US 11,428,117 B2
(45) Date of Patent: Aug. 30, 2022

(54) GAS TURBINE ENGINE SHAFT BREAK MITIGATION

(71) Applicant: ROLLS-ROYCE plc, London (GB)

(72) Inventors: Gareth L Jones, Calidicot (GB); Daniel J Williams, Bristol (GB); Natalie C Wong, Bristol (GB)

(73) Assignee: ROLLS-ROYCE plc, London (GB)

( * ) Notice: Subject to any disclaimer, the term of this patent is extended or adjusted under 35 U.S.C. 154(b) by 337 days.

(21) Appl. No.: 16/749,109

(22) Filed: Jan. 22, 2020

(65) Prior Publication Data
US 2020/0248581 A1 Aug. 6, 2020

(30) Foreign Application Priority Data
Feb. 4, 2019 (GB) ...................................... 1901514

(51) Int. Cl.
*F01D 21/02* (2006.01)
*F02K 3/10* (2006.01)
*F02C 9/48* (2006.01)

(52) U.S. Cl.
CPC ............... *F01D 21/02* (2013.01); *F02K 3/10* (2013.01); *F02C 9/48* (2013.01); *F05D 2220/323* (2013.01); *F05D 2240/60* (2013.01); *F05D 2270/021* (2013.01); *F05D 2270/023* (2013.01); *F05D 2270/051* (2013.01); *F05D 2270/304* (2013.01)

(58) Field of Classification Search
None
See application file for complete search history.

(56) References Cited

U.S. PATENT DOCUMENTS

| | | | | |
|---|---|---|---|---|
| 4,581,888 A | * | 4/1986 | Schmitzer | F04D 27/001 60/794 |
| 2006/0042226 A1 | | 3/2006 | Trumper et al. | |
| 2012/0317955 A1 | * | 12/2012 | Rowe | F01D 21/06 60/39.01 |
| 2013/0312423 A1 | | 11/2013 | Bacic et al. | |
| 2016/0010479 A1 | * | 1/2016 | Rice | F01D 17/02 415/118 |
| 2017/0254295 A1 | | 9/2017 | Moster et al. | |
| 2018/0187605 A1 | | 7/2018 | McCune et al. | |

OTHER PUBLICATIONS

Jul. 22, 2019 Search Report issued in British Application No. 1901514.8.
Jun. 29, 2020 Extended Search Report issued in European Patent Application No. 20151647.3.

* cited by examiner

*Primary Examiner* — Arun Goyal
*Assistant Examiner* — William L Breazeal
(74) *Attorney, Agent, or Firm* — Oliff PLC

(57) ABSTRACT

A method is provided of controlling a gas turbine having a shaft connecting a compressor to a turbine, as well as having a reheat system, and a gas turbine. The method includes the steps of: operating the engine using the reheat system to provide a mass flow rate of reheat fuel into a gas flow of the gas turbine engine downstream of an exit of the turbine; detecting a shaft break event in the shaft; and in response to this detection, maintaining the mass flow rate of the reheat fuel being provided into the gas flow downstream of the turbine exit, whereby the maintained mass flow rate of reheat fuel raises a back pressure downstream of the turbine and thereby reduces a rotational speed of the turbine.

9 Claims, 2 Drawing Sheets

GAS TURBINE ENGINE SHAFT BREAK MITIGATION

Figure 1:
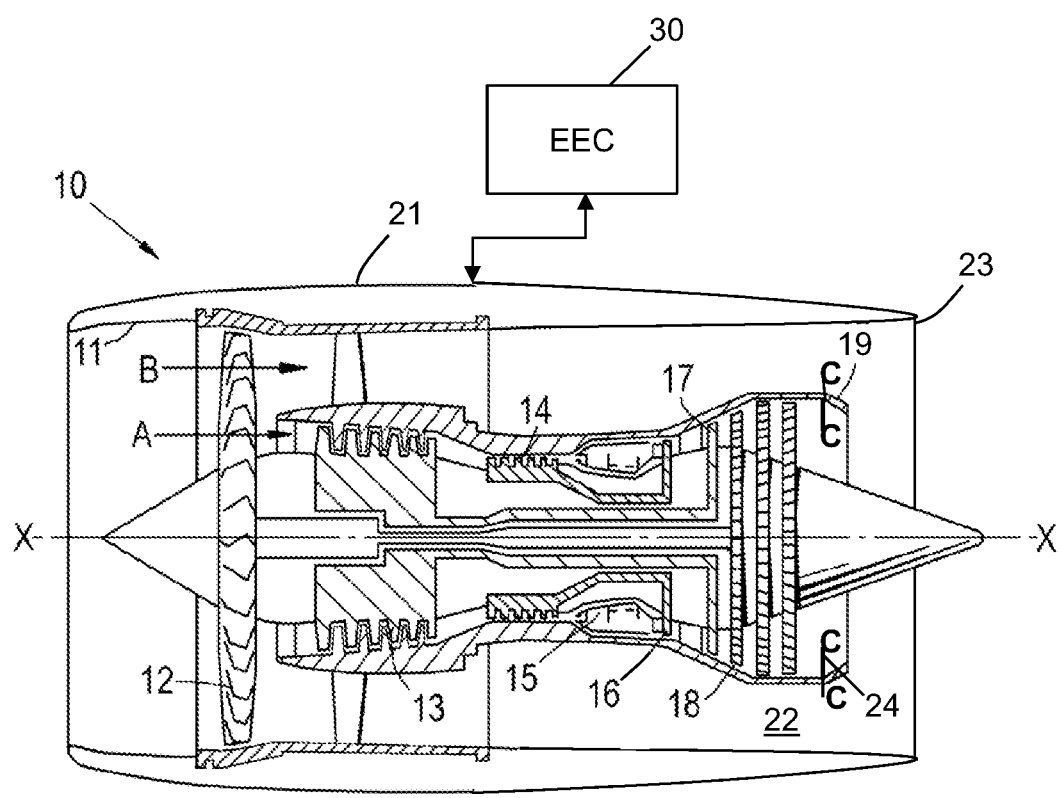

This disclosure claims the benefit of UK Patent Application No. GB 1901514.8, filed on 4 Feb. 2019, which is hereby incorporated herein in its entirety.

The disclosure relates to a gas turbine engine, and particularly a gas turbine engine for use in an aircraft.

Modern gas turbine engines generally have up to three compressor-turbine groups, also referred to as spools, connected by respective concentric shafts. These compressor-turbine groups are responsible for the compression and expansion of air passing through the engine.

For example, the Rolls-Royce Trent 1000 aerospace gas turbine engine has three compressor-turbine groups: the low pressure compressor-turbine group, the intermediate pressure compressor-turbine group, and the high pressure compressor-turbine group. Each of these has a corresponding compressor and turbine. In the case of the low pressure compressor-turbine group, the low pressure compressor is generally referred to as the fan.

It is possible, during operation of the gas turbine engine, for a shaft connecting a compressor and turbine pair to mechanically fail. The breakage in the shaft leads to an instantaneous decoupling between the turbine and its respective compressor. As a result the compressor may decelerate rapidly, as it is no longer driven by the turbine, and the turbine may accelerate rapidly, as it is no longer driving the compressor.

The rapid acceleration of the turbine is particularly concerning, as over-speed events can lead to disintegration of the turbine, including possibly bursting of the turbine disc, and further damage to the gas turbine engine.

It is important then to rapidly take the appropriate action when a shaft break occurs.

Accordingly, in a first aspect, the present disclosure provides a method of controlling a gas turbine engine having a shaft connecting a compressor to a turbine and further having a reheat system, the method including the steps of: operating the engine using the reheat system to provide a mass flow rate of reheat fuel into a gas flow of the gas turbine engine downstream of an exit of the turbine; detecting a shaft break event in the shaft and in response to this detection, maintaining the mass flow rate of the reheat fuel being provided into the gas flow downstream of the turbine exit, whereby the maintained mass flow rate of reheat fuel raises a back pressure downstream of the turbine and thereby reduces a rotational speed of the turbine.

Advantageously, the method according to the first aspect can decrease a terminal speed of the turbine after a shaft break event by reducing the amount of energy available to drive the turbine, meaning that, in the event of a disc burst, the debris would have a lower kinetic energy. Alternatively, the reduced energy can be parlayed into a reduced size and/or weight of the disc. This can also lower the debris' kinetic energy in the event of a disc burst.

The maintenance of the mass flow rate of the reheat fuel can be implemented in practice by (A) providing the same mass flow rate into the gas flow after the shaft break event as before the shaft break event, or (B) actually increasing the mass flow rate of the reheat fuel being provided into the gas flow downstream of the turbine exit after the shaft break event. That is, the increased mass flow rate of option (B) can be regarded as being made up of two portions: a first portion is the maintained mass flow rate, and the second portion is an additional mass flow rate. The additional mass flow rate can further raise the back pressure downstream of the turbine and thereby further reduce the rotational speed of the turbine.

The method of the first aspect may have any one, or any combination, of the following optional features.

The gas flow into which the mass flow rate of reheat fuel is provided is typically an exhaust of the turbine.

The step of maintaining the mass flow rate of the reheat fuel being provided into the gas flow downstream of the turbine exit may be performed by maintaining a fuel schedule for the reheat system in a pre-shaft break event configuration. Advantageously, this facilitates implementation of the method of the first aspect by a computer-based controller, such as an electronic engine controller, rather than by a mechanical device which might incur a weight penalty on the resulting gas turbine engine.

The raised back pressure acts to oppose the gas flow in its path from compressor to turbine, and it is this which reduces a rotational speed of the turbine. Preferably, raising the back pressure downstream of the turbine moves the working line of the compressor towards a surge region. This can encourage the compressor to surge or stall, resulting in a change in the direction of airflow through the gas turbine engine which can further reduce the rotational speed of the turbine.

In a second aspect, the present disclosure provides a gas turbine engine, comprising: a shaft connecting a compressor to a turbine; a reheat system; and an electronic engine controller wherein the electronic engine controller is configured to: operate the engine using the reheat system to provide a mass flow rate of reheat fuel into a gas flow of the gas turbine engine downstream of an exit of the turbine; detect a shaft break event in the shaft; and in response to this detection, maintain the mass flow rate of the reheat fuel being provided into the gas flow downstream of the turbine exit, whereby the maintained mass flow rate of reheat fuel raises a back pressure downstream of the turbine and thereby reduces a rotation speed of the turbine.

The engine of the second aspect may have any one, or any combination, of the following optional features.

The gas flow into which the mass flow rate of reheat fuel is provided is typically an exhaust of the turbine, or may be a bypass flow.

Maintaining the mass flow rate of the reheat fuel being provided into the gas flow downstream of the turbine exit may be performed by the electronic engine controller maintaining a fuel schedule for the reheat system in a pre-shaft break event configuration.

Raising the back pressure downstream of the turbine may move the working line of the compressor towards a surge region. This can encourage the compressor to surge or stall, resulting in a change in the direction of airflow through the gas turbine engine which can further reduce the rotational speed of the turbine.

In a third aspect, the present disclosure provides an aircraft including the gas turbine engine of the second aspect.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect.

Figure 2:
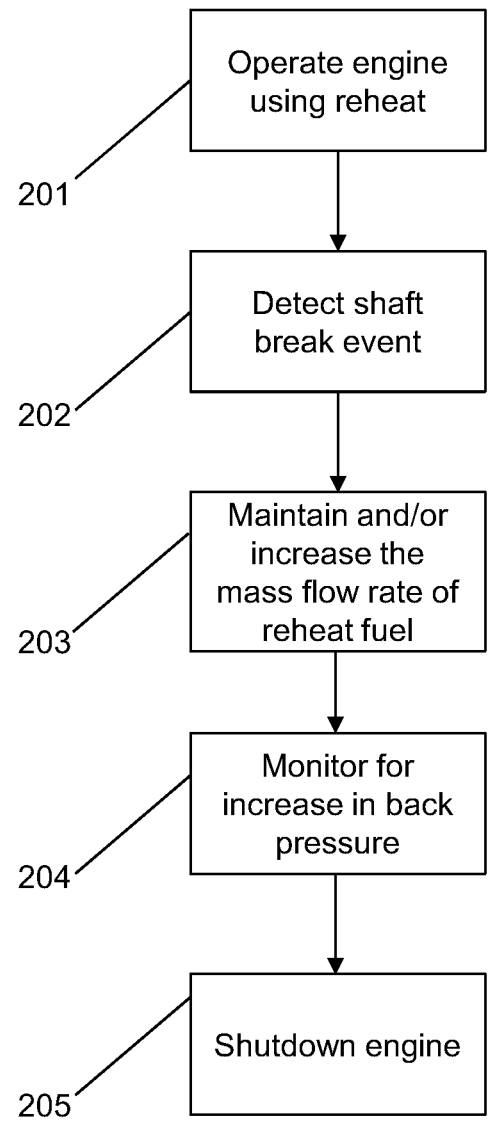

Embodiments of the present disclosure will now be described by way of example with reference to the accompanying drawings in which:

FIG. 1 shows a longitudinal cross-section through a ducted fan gas turbine engine; and FIG. 2 shows a method according to the present disclosure.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and Intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The gas turbine engine includes a reheat or afterburner system 24. The reheat system is operable to introduce additional fuel into the gas flow downstream of the last turbine (e.g. the low pressure turbine). This additional, or reheat, fuel is then combusted and therefore the velocity of the exhaust gas is increased, leading to an increase in the thrust provided by the gas turbine engine under these conditions.

Shaft break refers to a mechanical failure in the interconnecting shaft linking a compressor with a turbine, for example, the shaft linking the compressor fan 12 with low pressure turbine 18. Detection of a shaft break can be achieved, for example, by measuring the rotational speeds of the compressor and the corresponding turbine. A difference these in these rotational speeds can be indicative that they are no longer coupled, i.e. the shaft that connected them has broken.

A method according to the present disclosure is shown in FIG. 2. The method is used to control a gas turbine engine operating in the manner discussed above and may be performed by an electronic engine controller 30 connected to or integral with the gas turbine engine. In an initial step, 201, the gas turbine engine is operated using the reheat system. As discussed above, the reheat system introduces reheat fuel downstream of the last turbine, which is then combusted.

Next, in step 202, a shaft break event is detected. In response to this, step 203 is performed in which the mass flow rate of reheat fuel being provided is maintained at pre-shaft break event levels. This maintenance of the mass flow rate of the reheat fuel raises a back pressure downstream of the turbine, and thereby reduces a rotational speed of the turbine.

Thereafter, in an optional step 204, the electronic engine controller may monitor for this increase in back pressure. Once the back pressure value exceeds a predetermined threshold value, the method may move to optional step 205, wherein the engine is shut down.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

What is claimed is:

1. A method of controlling a gas turbine engine having a shaft connecting a compressor to a turbine and further having a reheat system, the method including the steps of:
   operating the gas turbine engine using the reheat system to provide a mass flow rate of reheat fuel into a gas flow of the gas turbine engine downstream of an exit of the turbine;
   detecting a shaft break event in the shaft; and
   in response to the detecting, maintaining and/or increasing the mass flow rate of the reheat fuel being provided into the gas flow downstream of the turbine exit, whereby the maintaining and/or increasing of the mass flow rate of reheat fuel creates a back pressure downstream of the turbine sufficient to reduce a rotational speed of the turbine.

2. The method of claim 1, wherein the step of maintaining and/or increasing the mass flow rate of the reheat fuel being provided into the gas flow downstream of the turbine exit is performed by maintaining a fuel schedule for the reheat system in a pre-shaft break event configuration.

3. The method of claim 1, whereby the back pressure downstream of the turbine moves a working line of the compressor towards a surge region.

4. A non-transitory computer readable medium storing a computer program comprising code which, when run on a computer, causes the computer to perform the method of claim 1.

5. A computer system programmed to perform the method of claim 1.

6. A gas turbine engine, comprising:
a shaft connecting a compressor to a turbine;
a reheat system; and
an electronic engine controller;
wherein the electronic engine controller is configured to:
operate the gas turbine engine using the reheat system to provide a mass flow rate of reheat fuel into a gas flow of the gas turbine engine downstream of an exit of the turbine;
detect a shaft break event in the shaft;
and in response to detection of the shaft break event, maintain and/or increase the mass flow rate of the reheat fuel being provided into the gas flow downstream of the turbine exit thereby creating a back pressure downstream of the turbine sufficient to reduce a rotational speed of the turbine.

7. The gas turbine engine of claim 6, wherein the electronic engine controller is configured to maintain and/or increase the mass flow rate of the reheat fuel being provided into the gas flow downstream of the exit of the turbine by maintaining a fuel schedule for the reheat system in a pre-shaft break event configuration.

8. The gas turbine engine of claim 6, wherein creating the back pressure downstream of the turbine moves a working line of the compressor towards a surge region.

9. An aircraft, including the gas turbine engine of claim 6.

* * * * *